United States Patent [19]

Davis et al.

[11] Patent Number: 4,605,355
[45] Date of Patent: Aug. 12, 1986

[54] PROPELLER

[75] Inventors: Robert J. Davis, Newburry; Charles R. Anspach, Painesville; John T. Venaleck, Madison, all of Ohio

[73] Assignee: Competition Aircraft, Inc., Painesville, Ohio

[21] Appl. No.: 480,711

[22] Filed: Mar. 31, 1983

[51] Int. Cl.$^4$ .............................................. B64C 11/06
[52] U.S. Cl. ................................. 416/208; 416/214 R; 416/241 A; 416/248
[58] Field of Search ................... 416/134 R, 207, 208, 416/248, 209, 214 R, 61, 214 A, 246, 241 A

[56] References Cited

U.S. PATENT DOCUMENTS

| | | | |
|---|---|---|---|
| 3,459 | 2/1844 | Loner | 416/223 |
| 2,027,647 | 1/1936 | Montgomery | 416/214 R X |
| 2,027,745 | 1/1936 | Montgomery | 416/214 R X |
| 2,232,670 | 2/1941 | Barrett | 416/207 |
| 2,613,752 | 10/1952 | Hawkins | 416/223 X |
| 2,645,294 | 7/1953 | Douthett | 416/DIG. 2 X |
| 2,765,858 | 10/1956 | Hardy | 416/245 |
| 2,765,859 | 10/1956 | Hartzell et al. | 416/207 |
| 2,918,977 | 12/1959 | Fedan et al. | 416/214 X |
| 2,985,245 | 5/1961 | Maloof | 416/223 X |
| 3,119,453 | 1/1964 | Haig | 416/248 X |
| 3,130,677 | 4/1964 | Liebhart | 416/208 |
| 3,161,239 | 12/1964 | Anderson | 416/208 X |
| 3,720,481 | 3/1971 | Motta | 416/207 X |
| 3,799,699 | 3/1974 | Master | 416/223 X |
| 3,963,373 | 6/1976 | Macauley | 416/214 |
| 4,053,259 | 10/1977 | Bianchi | 416/208 |
| 4,148,594 | 4/1979 | Stafford | 416/248 X |
| 4,193,740 | 3/1980 | Charles | 416/134 R X |
| 4,275,993 | 6/1981 | Sprengling | 416/207 |

FOREIGN PATENT DOCUMENTS

| | | | |
|---|---|---|---|
| 238027 | 10/1959 | Australia | 416/207 |
| 517285 | 7/1953 | Belgium | 416/248 |
| 2372972 | 8/1978 | France | 416/214 A |
| 540841 | 10/1941 | United Kingdom | 416/214 R |
| 574440 | 1/1946 | United Kingdom | 416/248 |
| 713855 | 8/1954 | United Kingdom | 416/208 |
| 801468 | 9/1958 | United Kingdom | 416/214 A |
| 860281 | 2/1961 | United Kingdom | 416/208 |

Primary Examiner—Everette A. Powell, Jr.
Attorney, Agent, or Firm—Renner, Otto, Boisselle & Lyon

[57] ABSTRACT

A propeller includes a rotatable hub with a plurality of sockets, blades with roots that fit in the sockets and a plurality of pitch blocks which fit between the blade root and the socket walls. Hubs with two, three, and four sockets are shown. The blades have no twist and are formed of molded, glass reinforced nylon. The pitch blocks are also nylon and different pairs of pitch blocks may be used to hold the blades at different angles. All nylon components are designed to minimize stress concentrations. The hubs although also of nylon have steel reinforcing plates within them which take the centripetal forces. These forces are transmitted through bolts to passage walls in the pitch blocks, and from the pitch blocks through interengaging teeth to the blade roots. A snap on, snap off aerodynamic spinner is also provided.

33 Claims, 29 Drawing Figures

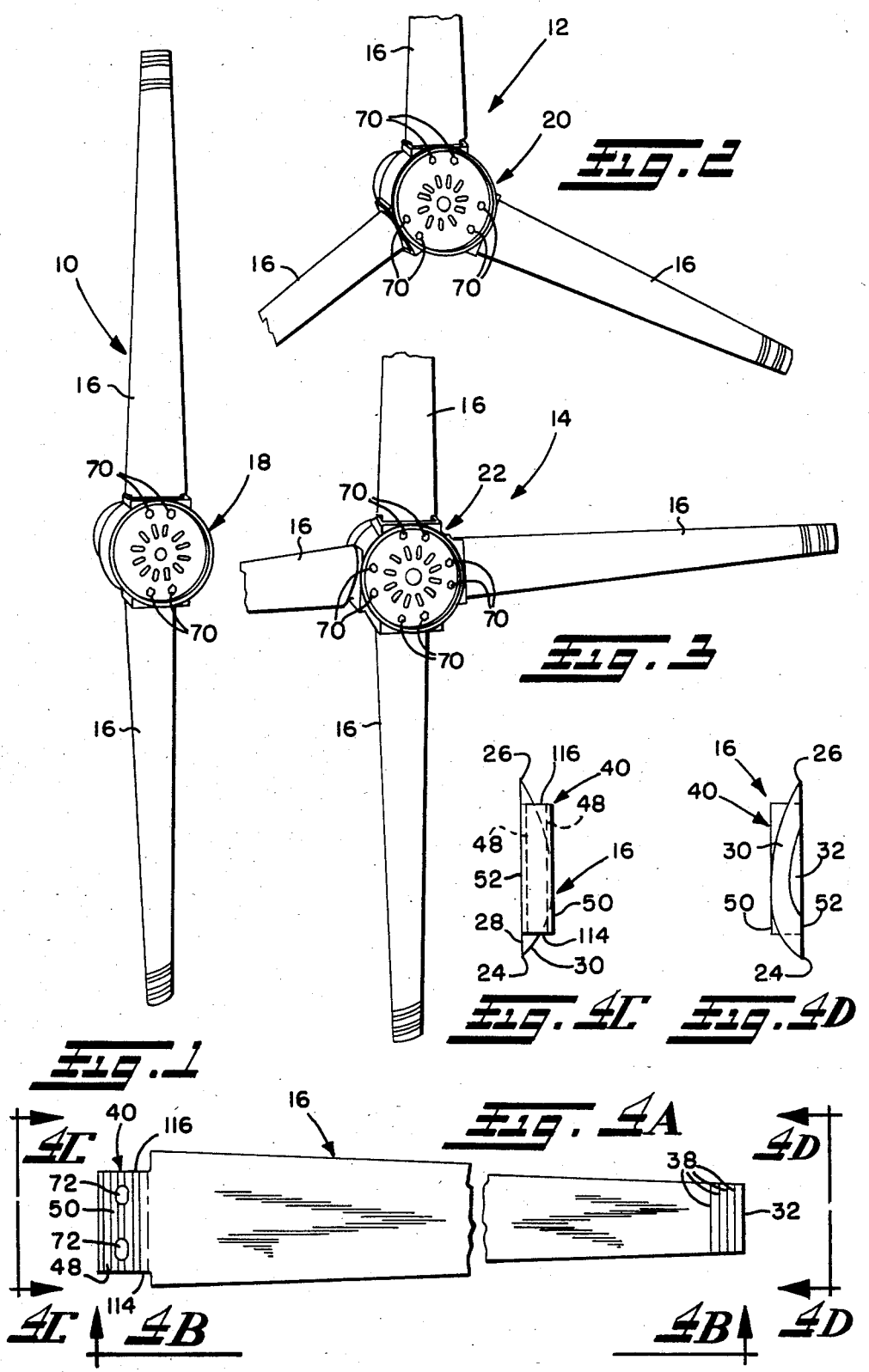

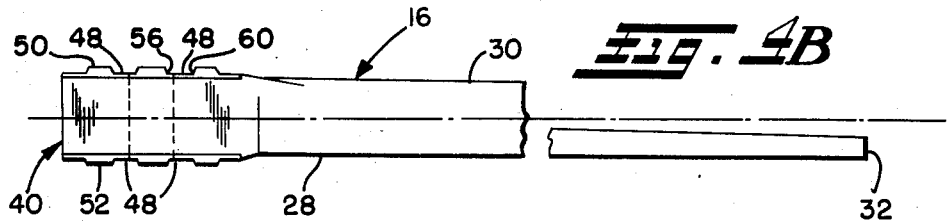
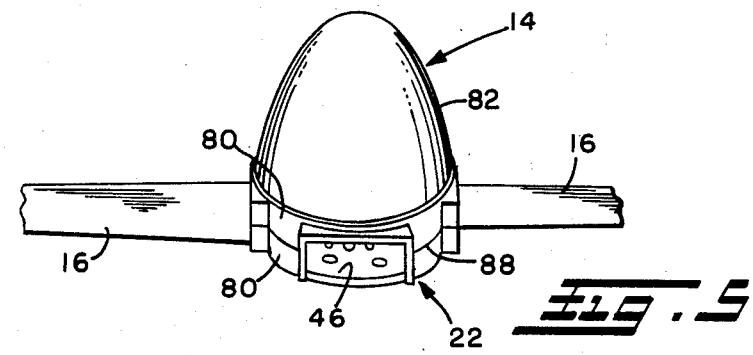
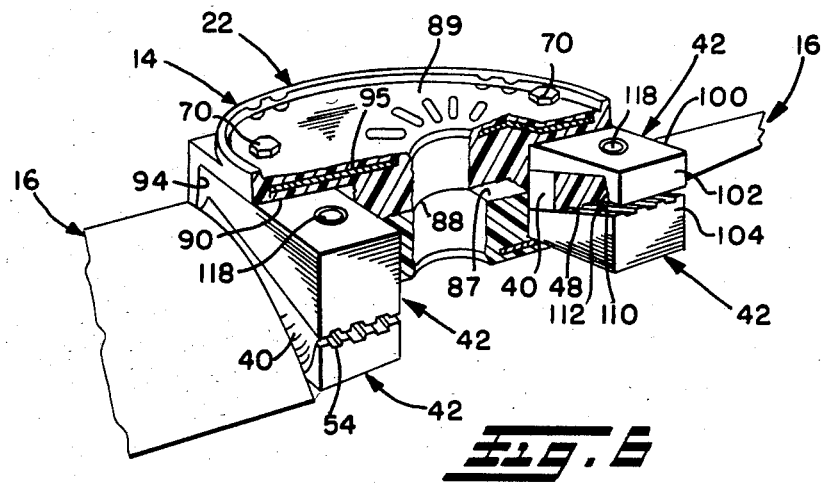
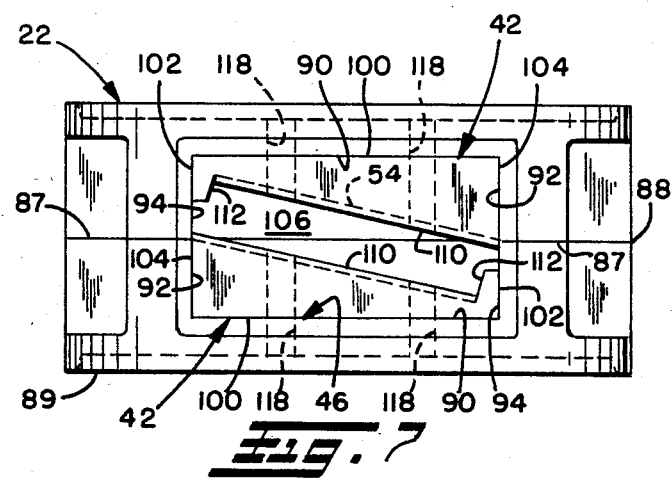

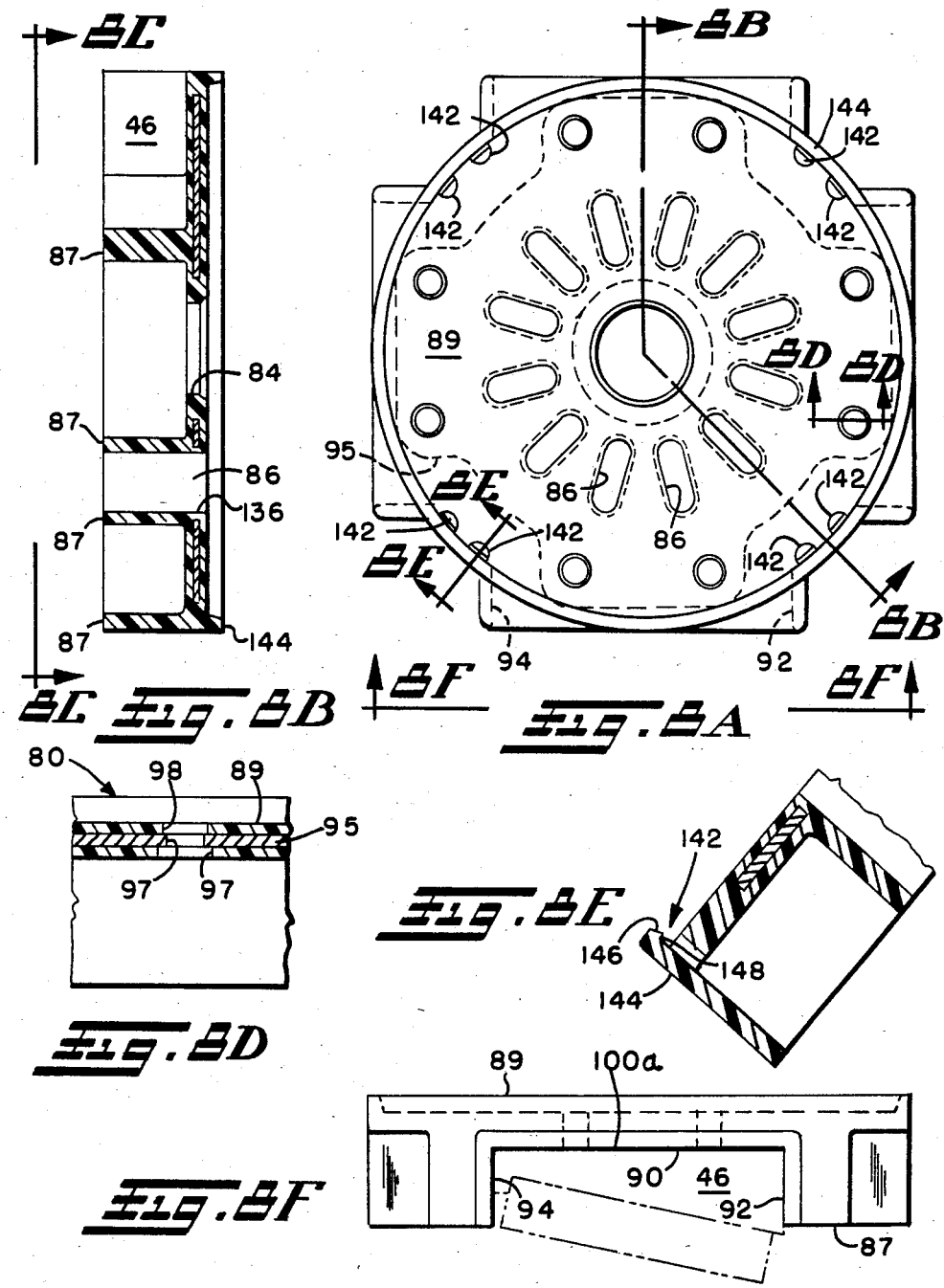

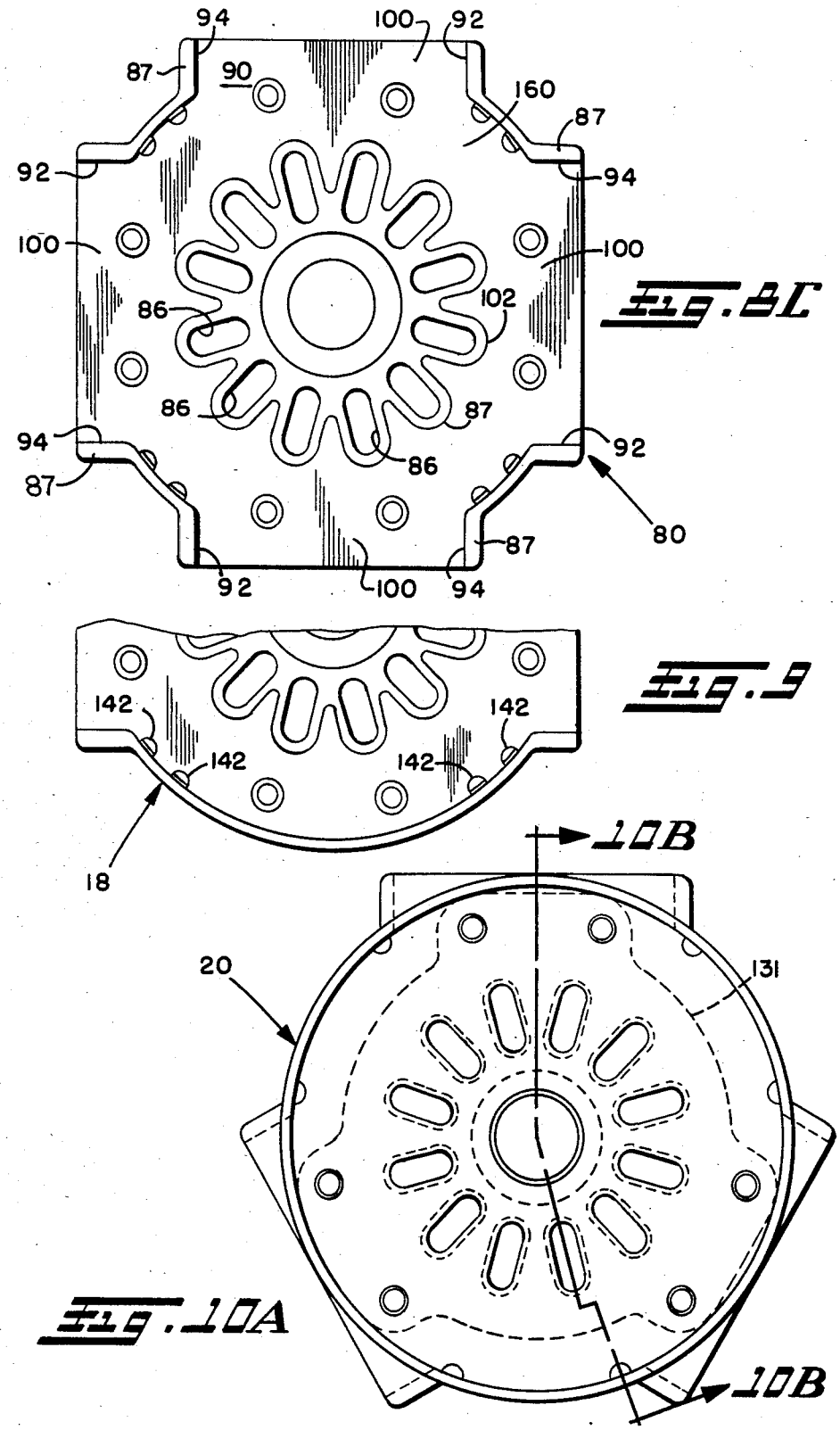

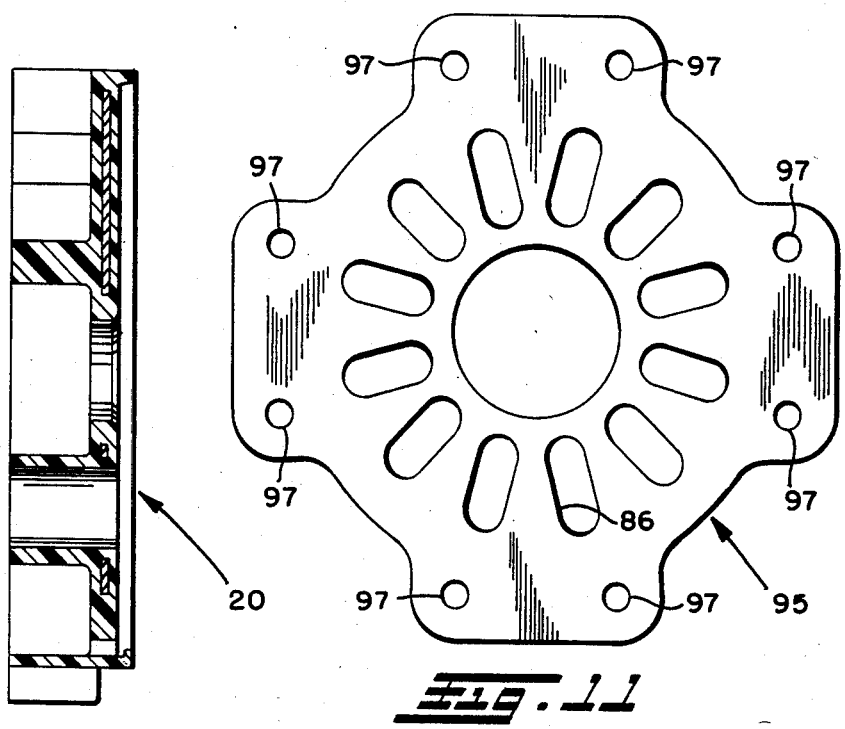
Fig. 10B
Fig. 11
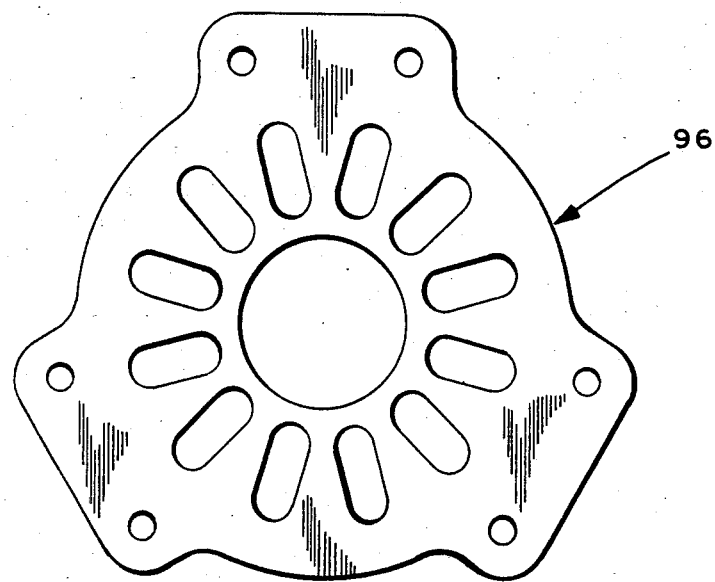
Fig. 12

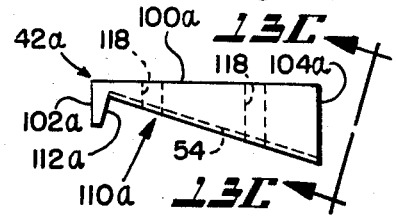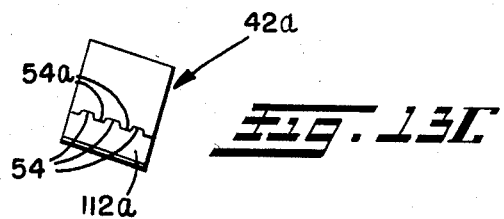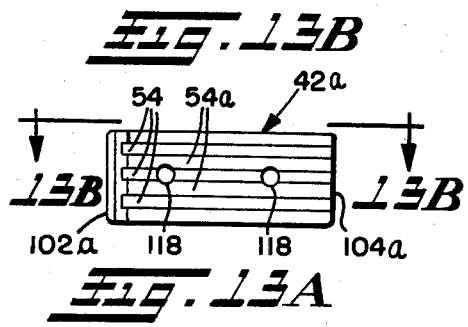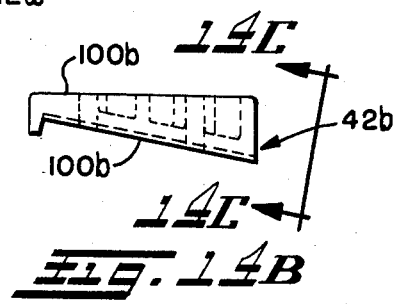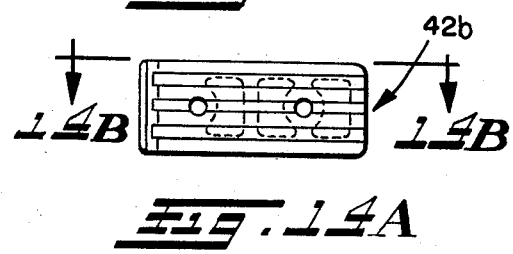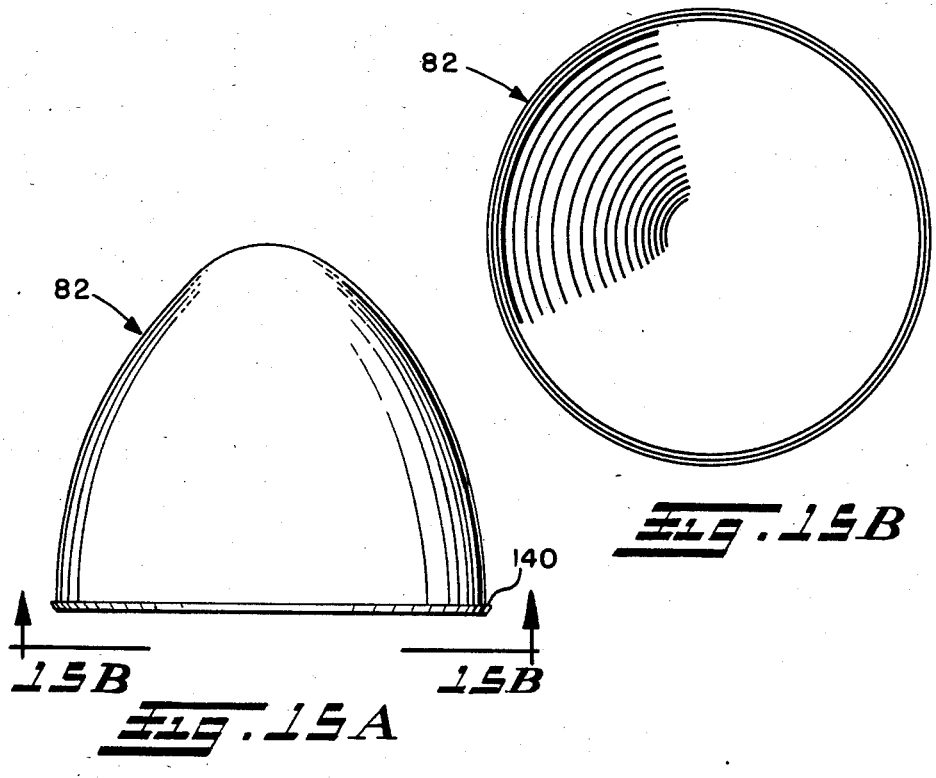

PROPELLER

BACKGROUND OF THE INVENTION

The present invention relates to propellers for aircraft, and in particular the present invention relates to a series of components which may be assembled to make propellers of different pitches and different diameters suitable for any of a wide range of ultralight aircraft.

Ultralight aircraft typically are made of tubing and wire rigging over which fabric is stretched to form air foils. To this air frame a small engine is attached. The engine is usually no more than two cylinders and less than about 40 horsepower. It drives a propeller either directly or through a reduction drive or transmission. These engines are tuned to produce maximum horsepower over a relatively narrow rpm range. The range of maximum power rpm at the output of a reduction drive is even narrower. Therefore the propeller must be matched to the engine, reduction drive, and air frame to allow the engine and propeller both to operate at maximum power.

Propellers for ultralight aircraft have traditionally been made of wood, usually laminated birch or walnut, and have been made by hand. Although wood has the advantage of being light and relatively strong, it also has inherent disadvantages. Wood is subject to warpage with changing temperature and humidity. Additionally, the density of wood is not uniform which means that two blades of a wood propeller, even if they have identical shapes, might not balance each other either statically or dynamically. As a consequence, wooden propellers have been relatively expensive, and when one blade is damaged, the entire unit must be replaced. Moreover, the replacement propeller, although supposedly the same as the damaged one, will never be identical to it and so identical performance cannot be assured.

Additionally, fitting a propeller to an ultralight aircraft is as much art as science. The interaction of engine, transmission, air frame, and propeller include too many variables to be completely understood from a theoretical approach. Although general guides are known for selecting a propeller of the proper pitch and diameter, in the final analysis trial and error is the only known method of selecting a propeller that will maximize performance.

SUMMARY OF THE INVENTION

The present invention provides a series of components from which propellers of different pitches and different diameters suitable to any of a wide range of ultralight aircraft may be assembled. Key components are universal blades which are mass produced by injection molding and are interchangeable with each other, a series of hubs with sockets to mount either two, three, or four of the blades, and pairs of pitch blocks which are used selectively between the blades and the hub socket mounting the blades to maintain a desired pitch angle for the blade. Other components include suitable threaded fasteners to secure the components to each other and a snap-on aerodynamic spinner covering the rear of the hub.

There are three different hubs which differ from each other in that one has two sockets, another three sockets, and the other four. Each hub is formed of two identical halves and each half is formed of nylon injection molded around a steel reinforcing plate. The hubs are a universal mount, adapted to bolt directly to the output flange of most standard ultralight motors or reduction drives. The two halves of the hub, when assembled, have surfaces defining radially extending, rectangular sockets in which the roots of the blades are received and which receive the torque applied by the blades.

The blades are injection molded glass reinforced nylon. The blades are as long as the longest blade likely to be required on an ultralight aircraft. The blades have a flat back surface, a curved front surface, and no twist. Therefore when installed, the blade angle, herein termed the pitch angle; is uniform along the entire length of the blade. Because all the blades are injection molded in the same mold, they are identical and therefore interchangeable. If a blade is damaged, only one blade need be replaced, not the entire propeller. The blades are also provided with a series of molded-in trim lines in parallel rows starting at the tip end of the blade. The trim lines make it possible to shorten the propeller blade by cutting and/or filing each along one of the lines. Because the trim lines are identical on each blade, it is a simple matter to trim all the blades of a propeller to the same length and still to maintain proper balance of the entire propeller.

The pitch blocks which support the blade roots in the sockets in the hubs have two functions, first they establish and maintain the pitch angle of the blades, and second they transfer centripetal force from the hub to the blade to retain the blade in the socket. The pitch blocks come in pairs which, when assembled, provide outside surfaces which fit tightly within the sockets in the hub. Each pair of pitch blocks defines a central rectangular opening in which the root of a blade fits. The central opening is angled with respect to the outside surfaces of the pitch block and therefore determines the pitch angle of the blade. Different pairs of pitch blocks hold the blades at different angles, so the pitch of the propeller can be changed merely by changing the pitch blocks.

Stress concentrations caused by centripetal force are avoided. Bolts pass through the two hub halves, a pair of pitch blocks, and an associated blade root. The bolts extend parallel to the axis of rotation of the propeller and are restrained from radial movement by contact with tight fitting bolt holes in the reinforcing plates in the hub. The bolt holes through the nylon portion of the hub are enlarged so that no centripetal forces are transmitted from the nylon portion of the hub to the bolts. Thus the centripetal force is transmitted by metal to metal contact between the hub and the bolts, but the stress is well below the yield point.

The bolts do not transmit any centripetal force directly to the blades. The holes through the blade roots are enlarged so there is no bolt to blade contact. The bolts do, however, have tight fitting contact with the holes through the pitch blocks. This contact transfers the centripetal force over a substantial surface area, thereby keeping the stress within the nylon pitch blocks to an acceptable level.

The pitch blocks and the blades have corrugated surfaces normal to the axis of the blades which carry all the centripetal loads between the pitch blocks and the blades. Because the bolts extend parallel to the axis of rotation, they carry the centripetal forces in shear, and because these same forces are transferred to the pitch blocks over a relatively large surface area of the bolt holes through the pitch blocks and from the pitch blocks to the blade over the relatively large corrugated surface area, there are no excessive stress concentrations in the nylon components to cause failure.

The invention, then, comprises the features hereinafter described and particularly pointed out in the claims, the following description and annexed drawings setting forth in detail certain illustrative embodiments of the invention, these being indicative of but a few of the various ways in which the invention may be embodied.

BRIEF DESCRIPTION OF THE DRAWINGS

In the drawings:

FIG. 1 illustrates a two-bladed propeller assembled from components constructed according to the present invention;

FIG. 2 illustrates a three-bladed propeller assembled from components constructed according to the present invention;

FIG. 3 illustrates a four-bladed propeller assembled from components constructed in accordance with the present invention;

FIG. 4A is a plan view of a blade constructed in accordance with the present invention;

FIG. 4B is a view looking in the direction of arrows 4B—4B of FIG. 4A;

FIG. 4C (on sheet 1 of the drawings) is a view looking in the direction of arrows 4C—4C of FIG. 4A;

FIG. 4D is a view looking in the direction of arrows 4D—4D of FIG. 4A;

FIG. 5 is a view of a partially assembled four-bladed propeller constructed in accordance with the present invention;

FIG. 6 is a partially cut-away view of the propeller of FIG. 13; and

FIG. 7 is a sectional view of a partially assembled propeller constructed in accordance with the present invention.

FIG. 8A is a plan view of a portion of a hub for a four-bladed propeller constructed in accordance with the present invention;

FIG. 8B is a sectional view looking in the direction of arrows 8B—8B of FIG. 8A;

FIG. 8C (on sheet 3 of the drawings) is a view looking in the direction of arrows 8C—8C of FIG. 8B;

FIG. 8D (on sheet 2 of the drawings) is a sectional view looking in the direction of arrows 8D—8D of FIG. 8A;

FIG. 8E is a sectional view looking in the direction of arrows 8E—8E of FIG. 8A;

FIG. 8F is a view looking in the direction of arrows 8F—8F of FIG. 8A;

FIG. 9 is a view of a portion of the hub of the two-bladed propeller illustrated in FIG. 1;

FIG. 10A is a view of a portion of the hub of the three-bladed propeller illustrated in FIG. 2; FIG. 10B is a view looking in the direction of arrows 10B—10B of FIG. 10A;

FIG. 11 is a plan view of a portion of the hub member illustrated in FIG. 8A;

FIG. 12 is a plan view of a portion of the hub member illustrated in FIG. 10A;

FIG. 13A illustrates a pitch block which may be used in any of the propellers illustrated in FIGS. 1, 2, and 3;

FIG. 13B is a view looking in the direction of arrows 13B—13B of FIG. 13A;

FIG. 13C is a view looking in the direction of arrows 13C—13C of FIG. 13B;

FIG. 14A is a view of another pitch block which may be used with any of the propellers illustrated in FIGS. 1, 2, and 3;

FIG. 14B is a view looking in the direction of arrows 14B—14B of FIG. 14A;

FIG. 14C is a view looking in the direction of arrows 14C—14C of FIG. 14B;

FIG. 15A is an elevation view of a spinner which may be used with any of the propellers illustrated in FIGS. 1, 2, and 3;

FIG. 15B is a view looking in the direction of arrows 15B—15B of FIG. 15A.

DESCRIPTION OF PREFERRED EMBODIMENTS

The present invention provides components which may be assembled to form a two-bladed propeller 10 (FIG. 1), a three-bladed propeller 12 (FIG. 2), or a four-bladed propeller 14 (FIG. 3), for an ultralight aircraft. Each of the propellers 10, 12 and 14 includes two or more identical blades 16 which are mounted in hubs 18, 20, and 22 (FIGS. 1, 2, and 3, respectively). The hubs 18, 20, and 22, in turn, may be mounted in a manner described more fully below to the output flange of a motor or a motor driven gear reducer on an ultralight aircraft. According to the present invention the pitch angle of the blades 16 with respect to the hub to which they are connected may be readily varied while the aircraft is on the ground and the diameter of the propeller assembly may be easily reduced with both adjustments being made so that the resulting propeller is ideally matched to the air frame, motor and transmission with which it is used.

The blades 16 are identical. They are made by injection molding, preferably by injection molding long glass reinforced nylon. The blades may be 40% glass filled.

The injection molding process provides significant advantages. First, the blades 16 are identical. This means that there are no difficult problems balancing the blades. Second, they are interchangeable. Therefore, if one blade 16 is broken or damaged, it may be replaced individually without replacing the entire propeller. Additionally, assembly is more economical since only one supply of blades is required to assemble any of the propellers 10, 12, and 14. Another advantage to injection molding lies in the ease with which testing of the product may be achieved. For example with conventional wood propellers testing for strength is essentially a destructive process. With injection molded blades, the nylon from the sprue and runner may be analyzed for physical properties which one can confidently assume are the same as the properties of the blade molded from the same material. Moreover, the long glass reinforcement provides substantial strength characteristics, and by injecting the melt into the mold from one end, for example, or in other prescribed way(s), alignment of the glass fibers can be substantially controlled to achieve desired strength characteristics.

The blade 16 is illustrated in greater detail in FIGS. 4A, 4B, 4C and 4D. The blade 16 has relatively sharp leading and trailing edges 24 and 26, respectively, which taper together from a 4" chord at the radially innermost part of the blade to a 2" chord at the tip 32 of the blade. The leading and trailing edges 24 and 26 are connected by a flat, chordal bottom surface 28 and an arcuate top surface 30.

The maximum height of the top surface 30 above the bottom surface 28 is located at about 40% of the chord length back from the leading edge 24. The maximum height of the top surface 30 varies along the length of the blade 16 from about 15% of the chord length at the radially inner end of the blade to about 11% of the chord length at the tip.

The blade 16 has no twist, and therefore the leading and trailing edges 24 and 26 are coplanar and the bottom surface 28 is flat. In this regard it should be noted that because the blade 16 has no twist, it is proper to speak of the "pitch angle" of this blade, which is uniform throughout its length. This angle is the oblique angle made between the chordal bottom surface 28 of the blade 16 and a plane normal to the axis of rotation of the blade 16 when it has been installed in a hub.

Since the blade 16 is not twisted as is a conventional propeller blade, it is particularly advantageous for use in a pusher mode. The blade 16 is less affected by disturbances in the approaching air stream than propellers with twisted blades. Most ultralight aircraft operate with the propeller in a "pusher" mode, i.e., with the engine immediately behind the pilot and the transmission (if any) and propeller behind the engine and operated to push the aircraft through the air.

The blades 16 (FIG. 4A) are molded to an initial length of, for example, 29½ inches, and when installed in a hub 18, 20, or 22, make a propeller 59 inches in diameter. The blades 16 all have identical trim lines 38 at the end portion toward the tip 32 to facilitate shortening of the blades uniformly where circumstances dictate. The trim lines 38 are parallel and generally transverse to the axis of the blade 16. The trim lines 38 make it possible to shorten the blades 16 of a propeller 10, 12, or 14 (FIGS. 1, 2, and 3) to a length corresponding to one of the trim lines using a hacksaw and/or a file. Perfect balance is retained because all of the blades 16 may be shortened exactly the same amount by simply shortening them to the same one of the trim lines 38. Such shortening may be necessary where the air frame will not accommodate a larger propeller or when the engine will not reach its rated rpm for maximum power. This condition may occur when fitting a propeller to a new engine. This condition may also occur when an engine wears and its maximum power output decreases because of the wear. Under these circumstances it may be desirable to trim the length of the blades so that the engine may again operate at its most efficient speed even though it is not producing the same power it once did.

As is seen in FIGS. 4–7, at the root 40 of each blade 16 is a portion adapted to be engaged by a pair of pitch blocks 42 which in turn fit into a socket 46 in a respective hub 18, 20, or 22. The root 40 (FIGS. 4A and 4B) is a rectangular solid, in plan view slightly narrower than the maximum chordal dimension of the blade 16, in elevation the same as the maximum thickness of the blade, and extending axially of the blade about 1¼ inches. The bottom surface 52 of the root 40 is continuous with the bottom surface 28 of the blade 16. Because the root 40, the pitch blocks 42 (FIG. 6) which engage the root, and the sockets 46 (FIG. 5) in which the pitch blocks fit are non-circular, they serve to transmit torque from the blade 16 to the hub 22. It is a feature of the present invention that these torques are transmitted over the relatively broad surfaces of the root 40, pitch blocks 42, and sockets 46, rather than through some element such as a shear pin, bolt or the like.

The root 40 (FIGS. 4A and 4B) includes a plurality of recesses 48 which extend transverse to the longitudinal axis of the blade. The recesses 48 are formed in both the top surface 50 (FIGS. 4A and 4B) and the bottom surface 52 (FIG. 4B) of the root 40. The recesses 48 transmit centripetal forces to the blade 16 (FIG. 6) from the pitch blocks 42 which have recesses 54 which interengage with the recesses 48 in the blade root 40. The recesses 48 (FIGS. 4A, 4B, and 4C) in the blade 16 are oriented perpendicular to the axis of the blade to provide the maximum surface area normal to the centripetal forces. Each of the recesses 48 (FIG. 4B) is shaped similar to an Acme thread with a flat bottom surface 56 and opposing oppositely inclined surfaces 58 and 60 which connect the bottom surface 56 of the recess with the surface, e.g., 50, of the root 40. All of the corners have suitable fillets. Of course, other shapes of grooves and arrangements of the grooves on the root 40 of the blade 16 can be used, so long as they effectively transmit the centripetal forces without undue stress concentrations in the root or the pitch blocks 42 which engage the root.

As will become clear from what follows, the blade 16 is intended to be mounted at any of a number of pitch angles in the sockets 46 of one of the hubs 18, 20, and 22. The blade 16 is secured in place in part by bolts 70, which pass through slots 72 in the root 40 of the blade 16. The slots 72 extend between the top surface 50 and bottom surface 52 of the root 40, and the slots have an oval cross-section with their major axes in a plane normal to the longitudinal axis of the blade 16 so that there is clearance for the bolts 70 regardless of the angular orientation to the blade 16 in the socket 46 (FIG. 5). Additionally, the minor axis of the oval slot 72 is slightly larger than the outside diameter of the bolts 70, so that preferably there is never any contact between the sides of the oval slots and the bolts, and therefore no forces can be transmitted directly from the bolts to the blade 16.

A hub 22 for four-bladed propeller 14 is shown in FIG. 5 with only two blades 16 attached, one more blade is not seen and the other has been removed for purposes of illustration of the socket 46. The hub 22 is formed of identical forward and rearward members 80. Attached to the rear member 80 as a "hub cap" is an aerodynamically shaped spinner 82. Because most ultralight aircraft operate with the propeller in a pusher mode, the spinner 82 is attached to the rear facing hub member 80 of the hub 22.

The two hub members 80 when aligned and clamped together have surfaces which define four identical sockets 46 in which the pitch blocks 42 and the roots 40 of the blades 16 fit. The hub members of which the hubs 18 and 20 are composed are generally similar but have only two and three sockets respectively.

The hub member 80 is shown in detail in FIGS. 8A–8F. The hub member 80 is formed of short glass fiber reinforced nylon and includes a central opening 84 which is preferably one inch in diameter. This is a standardized size for the shaft of ultralight motors and gear reduction units. The central opening 84 assures that the propeller 14 will be centered abouts its axis of rotation and that the hub members 80 will be properly aligned with each other and with the axis of rotation.

Evenly spaced about the central opening 84 are twelve oval slots 86 which accommodate bolts passing therethrough and into a drive flange connected with the output shaft of the ultralight engine (or gear reduction unit). Because twelve slots 86 are provided, the hub member 80 is suitable for use with drive flanges having three, four, six, or twelve evenly spaced threaded openings for bolts. Because the slots 86 are ovals with their major axes oriented radially of the central opening 84 through the hub member 80, drive flanges whose bolt holes are arranged in circles of different diameters can be accommodated. Should the drive flange of the engine (or transmission) to which the propeller 14 is connected use bolts smaller than the 5/16 inch minor diameter of the slots 86, tubular spacers (not shown) of appropriate wall thickness can be used to eliminate any circumferential play. A similar spacer may be used where the central opening 84 is larger than the shaft diameter of the engine (or transmission). Thus because of the standardized opening 84 and the shape and arrangement of the slots 86, the hub 22 (as well as the hubs 18 and 20 shown in FIGS. 1 and 2 which are similarly constructed) is a nearly universal mount and will fit most if not all engines and transmissions used on ultralight aircraft. As noted above, the hub 14 (FIG. 5) includes four sockets 46 which receive the pitch blocks 42 and the blade roots 40. Each of the sockets 46 is rectangular.

Each hub member 80 (FIG. 7) has an inside surface 87 which forms part of the seam or parting line 88 where the two hub members 80 abut each other upon assembly. Each hub member 80 also includes a flat outside surface 89 parallel to the parting line 88 and spaced therefrom and socket-defining surfaces 90, 92, and 94. The surface 90 is parallel to and axially offset from the parting line 88 while the two surfaces 92 and 94 are perpendicular to the surface 90. The surfaces 90, 92, and 94 define a shallow, squarish, U-shaped opening, and when these surfaces are matched with identical surfaces on another hub member 80, the rectangular socket 46 results.

The hub 22 (FIG. 8) has four identical sockets 46 situated 90° from each other. Likewise, the hub 18 (FIGS. 1 and 9) has but two sockets 46 which are positioned 180° apart. In similar fashion the hub 20 (FIGS. 2, 10A, and 10B) has three sockets 46 which are positioned 120° apart. In order to avoid unnecessary prolixity of description and because the construction of the hubs 18 and 20 is generally similar to that of hub 22 except for the number and spacing of sockets 46, it is believed not necessary further to describe hubs 18 and 20. From the description of hub 22 one of ordinary skill in the art could easily construct two and three socketed hubs to practice the present invention.

Each hub member 80 is molded with an integral steel reinforcing plate, such as that shown at 95 in FIG. 11 and at 96 in FIG. 12 (for use in the three socket hub 20), and a similar plate preferably would be molded in the hub members of a two socket hub 18. The plate 95 has bolt holes 97 and the hub members 80 have bolt holes 98 for corresponding alignment to pass therethrough bolts 70. Preferably, the reinforcing plate 95 is formed of steel having a yield strength of 80,000 psi.

Turning briefly back to FIGS. 6 and 7, each pair of pitch blocks 42 is composed of two identical pitch blocks which are adapted to engage the root 40 of a blade 16 and when so installed to fit within a socket 46. When the pair of pitch blocks 42 is installed on the root 40 of a blade 16, they have exterior surfaces 100, 102, and 104 which are tightly received in the rectangular socket 46. Each pitch block 42 also includes interior surfaces 110 and 112 which define a central rectangular opening 106. The opening 106 receives the root 40 of the blade 16. The axis of the central, rectangular opening 106 through the paired pitch blocks 42 is coincident with the axis of the socket 46 in which it fits, i.e., radial of the hub 22, but the side 110 of the opening 106 is not parallel with the outside surface 100, nor is the surface 112 parallel with the outside surfaces 102 and 104. Instead, the surface 110 is skewed at some predetermined angle of between about 6° and 20° with respect to the surface 100. The surface 112 is perpendicular to the surface 110 and therefore is disposed at the same angle with respect to surfaces 102 and 104.

When the root 40 of the blade 16 is fitted between two identical pitch blocks 42 and the pitch blocks are then inserted in a socket 46, the angle between the interior surface 110 and the exterior surface 100 of the pitch blocks 42 determine the angle of the blade 16 with respect to the plane of rotation of the hub 22. This angle is termed herein the pitch angle. As discussed above, because the blades 16 have no twist, the pitch angle is uniform along the entire length of the blades 16 when once installed.

The pitch blocks 42 may be easily replaced with pitch blocks which have a different angular relationship between interior and exterior surfaces. Two such pitch blocks, 42a and 42b are shown in FIGS. 13A-C and 14A-C, respectively, where similar numerals have been used to indicate similar components with the suffix a or b appended as appropriate. In the other Figures no distinction is made between the pitch blocks 42a and 42b and accordingly no suffix is used.

Each pitch block 42a (FIGS. 13A-C) includes a flat exterior surface 100a which is as long as or only slightly shorter than surface 90 (FIG. 7) which is abuts when installed in the hub 22. Perpendicular to surface 100a are two parallel end surfaces 102a and 104a which abut surfaces 94 and 92, respectively. Pitch block 42a also includes two mutually perpendicular interior surfaces 110a and 112a which engage the root 40 of the blade 16. The surface 110 includes recesses 54 which are complementary to the recesses 48 in root 40 of the blade 16 (FIG. 6). When the pitch blocks 42 are installed on the root 40 and squeezed together in a direction normal to the outside surfaces 100 of the pitch blocks, there is no play axially of the blade.

When two pitch blocks 42 are inserted into a socket 46 in a hub 22, they provide a pair of parallel, opposed surfaces 112 which are spaced apart from each other by a distance equal to or only very slightly larger than the distance between surfaces 114 and 116 (FIGS. 4A and 4C) of the root 40 of the blade 16. Thus the two surfaces 112 prevent movement of the blade in a direction parallel to the plane of the bottom surface 28 of the blade.

Each pitch block also includes a pair of passages 118 which extend from and normal to surface 100a through to the inside surface 110a. For purposes which will become clear below the passages 118 are a tight fit around the bolts 70 which pass through them.

The pitch block 42b illustrated in FIGS. 14A-C is generally similar to the block 42a except that the angle between surface 110b and surface 100b is less acute than is the angle between the corresponding surfaces 100a and 110a of pitch block 42a. Therefore, the pitch block 42b holds a blade at a less acute pitch angle when installed than do a pair of pitch blocks 42a. Of course, in assembling a propeller such as those illustrated in FIGS. 1, 2, and 3, each blade 16 must be at the same pitch angle. Therefore, the number of pairs of identical pitch blocks required is equal to the number of blades.

Referring to FIGS. 6 and 7, to assemble a propeller 10, 12, or 14, a pair of pitch blocks 42 are placed on opposite sides of each blade 16, the two hub halves 80 are aligned with each other and the blade and pitch block assemblies are inserted into the sockets 46. Thereafter bolts 70 are inserted and nuts (not shown) are tightened thereby drawing the entire assembly together. The bolts 70 retain the blades 16 in the sockets by applying centripetal force through two paths ultimately to the blades 16.

In operation with the propeller rotating, frictional engagement between the major outside surfaces 100 of the pitch blocks 42 and the corresponding surfaces 90 of the sockets 46 to some extent limits radial movement of the pitch blocks in the sockets. However, most of the centripetal force required to retain the blades 16 within the sockets is carried by the bolts 70 directly in shear. The hub members 80 including the reinforcing plates 95, the pitch blocks 42, and the blades 16 are designed to minimize stress concentrations on the nylon parts.

The plate 95 bolt holes 97 are a tight fit around the bolts 70 and make contact therewith. By contrast, the hub member 80 (FIG. 8D) holes or passages 98 through the nylon portions thereof are larger in diameter than the bolts 70. Therefore there is no contact between the nylon of the hub 80 and the bolts, except for the compressive loads applied to the outside surface 89 by tightening of the bolts.

Since the pitch blocks 42 have passages 118 which are a tight fit around the bolts 70 and since a bolt extending through a pair of pitch blocks has contact with the pitch blocks over a distance of about one inch, the centripetal force applied by the bolts to the pitch blocks is transferred over a relatively large surface area, and undue stress concentrations are avoided.

As noted above, the passages 72 through the blade roots 40 are larger in diameter than the bolts 70, so there is no direct load transfer between the bolts and the blades 16. The result is that the centripetal forces are transferred from the reinforcing plate 95 to each of the two bolts 70 per blade by metal to metal contact at two locations along each bolt, and from the bolts to the pitch blocks 42 through contact along a substantial surface area. From the pitch blocks 42 force is transmitted through the recesses 54 in the pitch blocks to the recesses 48 in each blade 16. This arrangement reduces stresses to the point where reinforced nylon may be used safely in situations where fomerly this was not possible.

The reinforcing plate 95 (FIG. 11) also includes twelve radially extending oval slots 136. These slots are disposed to coincide with the openings 86 (FIG. 8A) in the hub member 80, but are larger than the openings 86. Therefore during the molding process the slots 136 are entirely surrounded by reinforced nylon and no bare metal is exposed. This does not create a stress problem upon installation because no rotational torque is through the side walls of the slots 136. When the propeller, e.g., 14 (FIG. 1), is attached to the drive flange of a motor or transmission, bolts are inserted through the slots 136 and into threaded openings in the drive flange. The bolts are then tightened so tightly that the frictional engagement between the drive flange and the outside surface 89 (FIG. 8F) is sufficient to transmit all the engine torque to the blade.

The spinner 82 of FIG. 5 is attached to the rear facing one of the two hub members 80, as is shown in more detail in FIGS. 15A and 15B. The spinner 82 is generally bullet-shaped for aerodynamic purposes and is held in place by a lip 140 which extends radially outwardly around the perimeter of the spinner 82. The hub member 80 includes a plurality of radially inwardly extending hooks 142 (FIG. 8A) which project from a peripheral lip 144. Each of the hooks 142 (FIG. 8E) includes an inclined beveled surface 146 and a flat radially extending surface 148. When the spinner 80 is in place, the peripheral lip 144 serves to center the spinner 82 on the hub member 80 and the ledge surface 148 engages the lip 140 on the spinner 82 to secure the spinner in place.

Each of the hubs 18, 20 and 22 (FIGS. 1, 2, and 3) includes a number of hooks 142. The difference between the hubs resides in the location and number of hooks. The two-bladed hub 18 partially illustrated in FIG. 9 includes eight such hooks, two pairs of which are shown and two of which are symmetrically disposed relative thereto. Likewise, the hub 22 for a four-bladed propeller illustrated in FIG. 8A also includes eight hooks 142 which are arranged in four symmetrical pairs around the peripheral lip 144. The hub 20 for the three-bladed propeller illustrated in FIG. 10 includes only six hooks 142 which are also arranged symmetrically around the periphery of the lip 144.

The arrangement of hooks and lips on the spinner and hubs enables not only simple manufacture, but also facilitates removal of the spinner when it is necessary to have access to the bolts on the face of the hub. The spinner may be easily snapped into place, and it will remain there during normal operations. However, to remove the spinner it is only necessary to give it a sharp blow in a radial direction and it will pop off.

Finally it is pointed out that the hub members 80 and the pitch blocks 42 are lightened by eliminating unnecessary material. Thus the hub member 80 as shown in FIG. 8C has a planar portion 160 in which the reinforcing plate 95 is encapsulated and a twelve-pedaled elevated portion 162 which defines the twelve slots 86 and the central opening 84. Similarly the surfaces 92 and 94 are walls which project from the planar portion 160 and terminate at surface 87. The pitch blocks 42a and 42b (FIGS. 13A-C and 14A-C) may be lightened also. In the drawings pitch block 42b has been lightened as indicated by the phantom lines in FIGS. 14A and 14B, while the pitch block 42a has not been lightened. The guiding principle in weight reduction must be, of course, to leave material in all stressed areas, and remove the rest so that the final article is as strong as necessary and as light as possible.

Thus it is clear that the present invention provides a series of components from which propellers 10, 12, and 14 (FIGS. 1, 2, and 3) of different pitches and different diameters suitable to any of a wide range of ultralight aircraft may be assembled. Key components are the universal blades 16 which are mass produced by injection molding to be interchangeable with each other, a series of hubs 18, 20, and 22 with sockets 46 (FIG. 5) to mount either two, three, or four of the blades, and pairs of pitch blocks 42 (FIG. 6) which are used selectively between the blades and the hub sockets mounting the blades to maintain a desired pitch angle for the blade. Other components include suitable threaded fasteners 70 to secure the components to each other and a snap-on aerodynamic spinner 82 (FIG. 5) covering the rear of the hub.

The three hubs 18, 20, and 22 (FIGS. 1, 2, and 3) are generally similar except that one has two sockets 46, another three sockets, and the other four. Each hub is formed of two identical halves 80 (FIG. 6) and each half is formed of nylon injection molded around a steel reinforcing plate 95. The hubs are a universal mount, adapted to bolt directly to the output flange of most standard ultralight motors or reduction drives. The two halves of the hub, when assembled, have surfaces 90, 92, and 94 (FIG. 7) defining the radially extending, rectangular sockets in which the roots 40 (FIG. 6) of the blades 16 are received and which receive the torque applied by the blades.

The blades 16 are injection molded glass reinforced nylon. The blades are as long as the longest blade likely to be required on an ultralight aircraft. The blades 16 have a flat back surface 28 (FIG. 4C), a curved front surface 30, and no twist. Therefore when installed, the blade angle, herein termed the pitch angle, is uniform along the entire length of the blade. Because all the blades 16 are injection molded in the same mold, they are identical and therefore interchangeable. If a blade 16 is damaged, only one blade need be replaced, not the entire propeller. The blades 16 are also provided with a series of molded-in trim lines 38 (FIG. 4A) in parallel rows starting at the tip end of the blade. The trim lines 38 make it possible to shorten the propeller blade by cutting or filing each along one of the lines. Because the trim lines are identical on each blade, it is a simple matter to trim all the blades of a propeller to the same length and still to maintain proper balance of the entire propeller.

The pitch blocks 42 (FIG. 6) which support the blade roots 40 in the sockets in the hubs have two functions, first they establish and maintain the pitch angle of the blades 16, and second they transfer centripetal force from the hub 18, 20, or 22 to the blade to retain the blade in the socket 46. The pitch blocks 42 come in pairs which, when assembled, provide outside surfaces 100, 102, 104 (FIG. 7) which fit tightly within the sockets 46 in the hub. Each pair of pitch blocks defines a central rectangular opening 106 in which the root of a blade fits. The central opening 106 is angled with respect to the outside surfaces of the pitch block 42 and therefore determines the pitch angle of the blade. Different pairs of pitch blocks 42 (compare FIGS. 13A–C with FIGS. 14A–C) hold the blades 16 at different angles, so the pitch of the propeller can be changed merely by changing the pitch blocks.

Stress concentrations caused by centripetal force are avoided. Bolts 70 (FIG. 6) pass through the two hub halves 80, a pair of pitch blocks 42, and an associated blade root 40. The bolts 70 extend parallel to the axis of rotation of the propeller 14 and are restrained from radial movement by contact with tight fitting bolt holes 97 (FIG. 8D) in the reinforcing plates 95 in the hub. The bolt holes 98 through the nylon portion of the hub are enlarged so that no centripetal forces are transmitted from the nylon portion of the hub to the bolts. Thus the centripetal force is transmitted by metal to metal contact between the hub and the bolts 70, but the stress is well below the yield point.

The bolts 70 do not transmit any centripetal force directly to the blades 16 (FIG. 4A). The holes 72 through the blade roots 40 are enlarged so there is no bolt to blade contact. The bolts 70 do, however, have tight fitting contact with the holes 118 (FIG. 7) through the pitch blocks 42. This contact transfers the centripetal force over a substantial surface area, thereby keeping the stress to an acceptable level.

The pitch blocks 42 and the blades 16 (FIG. 6) have corrugated surfaces 48 and 54 normal to the axis of the blades which carry all the centripetal loads between the pitch blocks and the blades. Because the bolts 70 extend parallel to the axis of rotation, they carry the centripetal forces in shear, and because these same forces are transferred to the pitch blocks 42 over a relatively large surface area of the bolt holes 118 through the pitch blocks and from the pitch blocks to the blade over the relatively large corrugated surface area, there are no excessive stress concentrations in the nylon components to cause failure.

The following is claimed:

1. An aircraft propeller comprising a rotatable hub having a plurality of sockets, a plurality of propeller blades each with an air foil portion and a root portion of noncircular transverse cross-section, and a plurality of pairs of opposed pitch blocks received within respective sockets to hold therebetween the root portions of respective blades, each pair of pitch blocks having a noncircular surface engaging a noncircular outer side of the root portion of the respective blade to fix the blade at a thusly determined pitch angle to the axis of the hub.

2. A propeller as set forth in claim 1, wherein each pair of pitch blocks is interchangeable with a different pair of pitch blocks having the noncircular surface thereof disposed at a different angular inclination to the axis of the hub for fixing the respective blade at a different pitch angle.

3. A propeller as set forth in claim 2, wherein each socket is noncircular, and each pair of pitch blocks is closely fitted within the respective socket against movement relative to the hub.

4. A propeller as set forth in claim 3, wherein each socket is rectangular in shape, and each pair of pitch blocks has an outer perimeter of corresponding rectangular shape for nested close fitted receipt in the respective socket.

5. A propeller as set forth in claim 1, wherein the pitch block of each pair thereof has a noncircular surface engaging a respective noncircular outer side of the root portion of the respective blade.

6. A propeller as set forth in claim 5, wherein the noncircular surface of each pitch block is parallel to the noncircular surface of the other pitch block.

7. A propeller as set forth in claim 1, wherein the pitch blocks of each pair thereof define therebetween a noncircular opening corresponding in cross-sectional shape to that of the root portion of the respective blade.

8. A propeller as set forth in claim 7, wherein said noncircular opening is rectangular in cross-sectional shape.

9. A propeller as set forth in claim 8, wherein each socket is rectangular in shape having the major axis thereof residing in a plane normal to the axis of the hub, and the major axis of the noncircular opening of each pair of pitch blocks is at an angle to the major axis of the respective socket.

10. A propeller as set forth in claim 1, wherein each pair of pitch blocks and the root portion of the respective blocks have interlocking surface means for transfer of forces between said pitch blocks and root portions radially of said hub.

11. A propeller as set forth in claim 10, wherein said interlocking surface means includes a plurality of planar surfaces extending transversely to the length of the respective blade.

12. A propeller as set forth in claim 1, further comprising connecting means for transmitting forces between said hub and pitch blocks radially of said hub.

13. A propeller as set forth in claim 2, wherein said connecting means includes bolts extending axially through said hub and said pitch blocks.

14. A propeller as set forth in claim 13, wherein said bolts extend through passages in said blades and are free of contact with the walls of said passages.

15. A propeller as set forth in claim 13, wherein said hub is formed of injected molded plastic and includes a metal reinforcing plate having holes in which said bolts are tightly fitted.

16. A propeller as set forth in claim 15, wherein each pair of pitch blocks and the root portion of the respective blocks have interlocking surface means for transfer of forces between said pitch blocks and root portions radially of said hub.

17. A propeller as set forth in claim 16, wherein said interlocking surface means includes a plurality of planar surfaces extending transversely to the length of the respective blade.

18. A propeller as set forth in claim 1, wherein said hub includes first and second hub members forming respective side surfaces of each socket.

19. A propeller as set forth in claim 18, further comprising means for securing said hub members, pitch blocks and blades in assembled condition, said means for securing including bolts extending through aligned passages in each of said hub members, pitch blocks and the root portions of said blocks.

20. A propeller as set forth in claim 1, wherein said air foil portion has coplanar leading and trailing edges.

21. A propeller as set forth in claim 20, wherein each blade includes a plurality of trim lines in spaced relationship to each other.

22. A propeller as set forth in claim 20, wherein each blade has an essentially planar surface interconnecting said leading and trailing edges.

23. A propeller as set forth in claim 1, further comprising a snap-off spinner for said hub.

24. A propeller with components interchangeable for use with a wide range of ultralight aircraft, comprising a rotatable hub having a plurality of noncircular sockets, a plurality of interchangeable blades each with an air foil portion and a noncircular root portion, and a plurality of interchangeable pairs of pitch blocks outwardly dimensioned to fit closely and be held against rotation in respective sockets at noncircular outer surfaces engaging respective noncircular sides of the socket, the pitch blocks of each pair defining therebetween a noncircular opening for close fitted receipt of the root portion of a respective blade for maintaining the blade at a corresponding pitch angle to the axis of the hub.

25. A propeller as set forth in claim 24, wherein the pitch blocks of each pair thereof have opposed parallel surfaces engaging respective opposite parallel sides of the root portion of the respective blade.

26. A propeller as set forth in claim 25, wherein said parallel surfaces of said pitch blocks are inclined to the axis of said hub.

27. A propeller as set forth in claim 24, wherein each socket is rectangular in shape having the major axis thereof residing in a plane normal to the axis of the hub, and the major axis of the noncircular opening of each pair of pitch blocks is at an angle to the major axis of the respective socket.

28. A propeller as set forth in claim 24, wherein each pair of pitch blocks and the root portion of the respective blades have interlocking surface means for transfer of forces between said pitch blocks and root portions radially of said hub.

29. A propeller as set forth in claim 28, wherein said interlocking surface means includes a plurality of planar surfaces extending transversely to the length of the respective blade.

30. A propeller as set forth in claim 24, further comprising connecting means for transmitting forces between said hub and pitch blocks radially of said hub.

31. A propeller as set forth in claim 30, wherein said connecting means includes bolts extending axially through said hub and said pitch blocks.

32. A propeller as set forth in claim 31, wherein said bolts extend through passages in said blades and are free of contact with the walls of said passages.

33. A propeller as set forth in claim 31, wherein said hub is formed of injected molded plastic and includes a metal reinforcing plate having holes in which said bolts are tightly fitted.

* * * * *